(12) United States Patent
Hurst

(10) Patent No.: US 9,379,855 B2
(45) Date of Patent: Jun. 28, 2016

(54) METHOD AND APPARATUS FOR A REMOTE MODULAR TEST SYSTEM

(71) Applicant: MiCOM Labs, Inc., Pleasanton, CA (US)

(72) Inventor: Gordon McLeod Hurst, Danville, CA (US)

(*) Notice: Subject to any disclaimer, the term of this patent is extended or adjusted under 35 U.S.C. 154(b) by 129 days.

(21) Appl. No.: 14/294,753

(22) Filed: Jun. 3, 2014

(65) Prior Publication Data

US 2014/0359360 A1 Dec. 4, 2014

Related U.S. Application Data

(60) Provisional application No. 61/830,440, filed on Jun. 3, 2013.

(51) Int. Cl.
*G06F 11/00* (2006.01)
*H04L 1/24* (2006.01)

(52) U.S. Cl.
CPC ........................................ *H04L 1/24* (2013.01)

(58) Field of Classification Search
CPC .................................................. G06F 11/2294
See application file for complete search history.

(56) References Cited

U.S. PATENT DOCUMENTS

| | | | | |
|---|---|---|---|---|
| 5,565,316 | A * | 10/1996 | Kershaw | G09B 7/02 434/118 |
| 7,181,360 | B1 * | 2/2007 | Nikolac | H04L 12/2697 702/119 |
| 2005/0197860 | A1 * | 9/2005 | Joffe | G06Q 50/22 705/2 |
| 2006/0212540 | A1 * | 9/2006 | Chon | G06F 11/261 709/218 |
| 2007/0210800 | A1 * | 9/2007 | Krampitz | H01M 10/4285 324/426 |
| 2010/0218044 | A1 * | 8/2010 | Roblett | H04L 43/50 714/32 |
| 2011/0077892 | A1 * | 3/2011 | Emami | H04L 67/12 702/113 |
| 2012/0041636 | A1 * | 2/2012 | Johnson | G07C 5/008 701/31.4 |
| 2012/0143937 | A1 * | 6/2012 | Boisde | H04L 67/02 709/201 |
| 2012/0182121 | A1 * | 7/2012 | Mueck | H04W 8/22 340/5.2 |
| 2012/0300649 | A1 * | 11/2012 | Parmar | H04L 43/0888 370/252 |
| 2013/0297225 | A1 * | 11/2013 | Jeffers | G05B 19/042 702/22 |
| 2014/0359360 | A1 * | 12/2014 | Hurst | H04L 1/24 714/31 |

* cited by examiner

*Primary Examiner* — Amine Riad
(74) *Attorney, Agent, or Firm* — Squire Patton Boggs (US) LLP

(57) ABSTRACT

Certain embodiments generally relate to equipment under test measurements and reports, such as, but not limited to methods and apparatuses for a remote modular test system. For example, the method may include determining a test strategy (TS) file based on input from cloud-based equipment under test questionnaire and a cloud-based standards library. The method may also include reading the TS via a system controller. The method may further include configuring test hardware, for example, analyzers and power meters via a test RF system interface based on the read TS. The method may also include sequentially executing the TS based on the configuring. The method may further include generating a test document comprising result data. The method may also include uploading and processing the generated test document in the cloud. The method may further include grouping and compiling the generated test document in a predetermined layout.

16 Claims, 3 Drawing Sheets

METHOD AND APPARATUS FOR A REMOTE MODULAR TEST SYSTEM

CROSS-REFERENCE TO RELATED APPLICATION

This application is related to and claims priority of U.S. Provisional Patent Application No. 61/830,440, which was filed Jun. 3, 2013, and which is hereby incorporated herein by reference in its entirety.

BACKGROUND

1. Field

Various equipment testing systems may benefit from methods and apparatuses for remote modular testing. For example, remote regulatory compliance testing and certification for new products may be performed within a secure environment of a lab environment via use of cloud-based remote technology according to certain embodiments.

2. Description of the Related Art

In general, electronic devices, such as mobile phones, digital cameras, tablet computers, and the like may be part of a wireless local area network, such as, wireless enterprise networks or wireless public networks. In order to meet any regulatory requirements, such as with the Federal Communications Commission (FCC) compliance, these devices and networks must be tested. Usually, a variety of general radio frequency (RF) and software tools, such as spectrum analyzers and listen-only protocol analyzers test the conformance of various electronic devices. Other test equipment may include standalone/instrumentation used manually during the testing function.

Currently, to obtain product certification, testing may be performed by a laboratory which must obtain sample devices or equipment, and transport such devices or equipment to the lab facility to perform various compliance tests on the devices or equipment. The lab then must manually forward the test results to an originating company and/or agency, such as the FCC.

As a result of compressed shelf life, there is a need to reduce testing times, provide greater flexibility/control to manufacturers for tests, and provide a more uniform test report.

SUMMARY

According to certain embodiments, a method for remote modular testing can include receiving data, via a node server, from a remote server, wherein the received data comprises a questionnaire file for an equipment to be tested and a selected standard from a standards library database. The method can also include determining, via the node server, a test strategy file based on the received data. The method can further include identifying, via the node server, at least one test to be configured and implemented based on the test strategy file. The method can also include executing, via the node server, the test strategy file for the at least one identified test. The method can further include generating, via the node server, a test results document for the at least one identified test. The method can also include sending, via the node server, the test results document for the at least one identified test to the remote server.

According to other embodiments, a method for remote modular testing, can include accessing, via a user equipment, a questionnaire file for an equipment to be tested. The method can also include selecting, via the user equipment, a standard from a standards library database. The method can further include filtering, via the user equipment, data from the questionnaire file and the selected standard for the equipment to be tested. The method can also include sending, via the user equipment, the filtered data to a node server for the equipment to be tested.

An apparatus according to certain embodiments can include at least one processor. The apparatus can also include at least one memory including computer program code. The at least one memory and the computer program code can be configured to, with the at least one processor, cause the apparatus at least to receive data, via a node server, from a remote server. The received data can include a questionnaire file for an equipment to be tested and a selected standard from a standards library database. The at least one memory and the computer program code can also be configured to, with the at least one processor, cause the apparatus at least to determine, via the node server, a test strategy file based on the received data. The at least one memory and the computer program code can further be configured to, with the at least one processor, cause the apparatus at least to identify, via the node server, at least one test to be configured and implemented based on the test strategy file. The at least one memory and the computer program code can also be configured to, with the at least one processor, cause the apparatus at least to execute, via the node server, the test strategy file for the at least one identified test. The at least one memory and the computer program code can further be configured to, with the at least one processor, cause the apparatus at least to generate, via the node server, a test results document for the at least one identified test. The at least one memory and the computer program code can also be configured to, with the at least one processor, cause the apparatus at least to send, via the node server, the test results document for the at least one identified test to the remote server.

An apparatus according to other embodiments can include at least one processor. The apparatus can also include at least one memory including computer program code. The at least one memory and the computer program code can be configured to, with the at least one processor, cause the apparatus at least to access, via a user equipment, a questionnaire file for an equipment to be tested. The at least one memory and the computer program code can also configured to, with the at least one processor, cause the apparatus at least to select, via the user equipment, a standard from a standards library database. The at least one memory and the computer program code can further be configured to, with the at least one processor, cause the apparatus at least to filter, via the user equipment, data from the questionnaire file and the selected standard for the equipment to be tested. The at least one memory and the computer program code can also be configured to, with the at least one processor, cause the apparatus at least to send, via the user equipment, the filtered data to a node server for the equipment to be tested.

BRIEF DESCRIPTION OF THE DRAWINGS

For proper understanding of the invention, reference should be made to the accompanying drawings, wherein.

DETAILED DESCRIPTION

The following description is merely exemplary in nature and is not intended to limit the present disclosure or the disclosure's applications or uses. Before turning to the figures and the various exemplary embodiments illustrated therein, a detailed overview of various embodiments and aspects is provided for purposes of breadth of scope, context, clarity, and completeness.

Certain embodiments describe a remote modular test system that uses hardware and software to automate the testing and measurements of devices. In certain embodiments, hardware and software may be used as a vehicle for automated regulatory compliance testing for wireless devices. In other embodiments test software is scalable and the ability to change hardware facilitates the testing of different types of products and therefore introduces the capability to test different technologies and standards.

In some embodiments, a user equipment (UE) may allow manufacturers, who have purchased an access code, to log into their account and have access to the remote modular test system. Certain embodiments give rise to the capability of providing test services via a cloud-based network environment. Potentially with equipment in one location, control testing can be performed from any global location through Internet access. In certain embodiments, the remote modular test system may be configured to generate a test strategy (TS) using input from an equipment questionnaire and any selected standard from a standards repository/database (all cloud-based). The remote modular test system can provide an ability to automate and formalize test processes and procedures with automatic generation of test reports—this includes data processing with supporting graphical plots.

Figure 1:
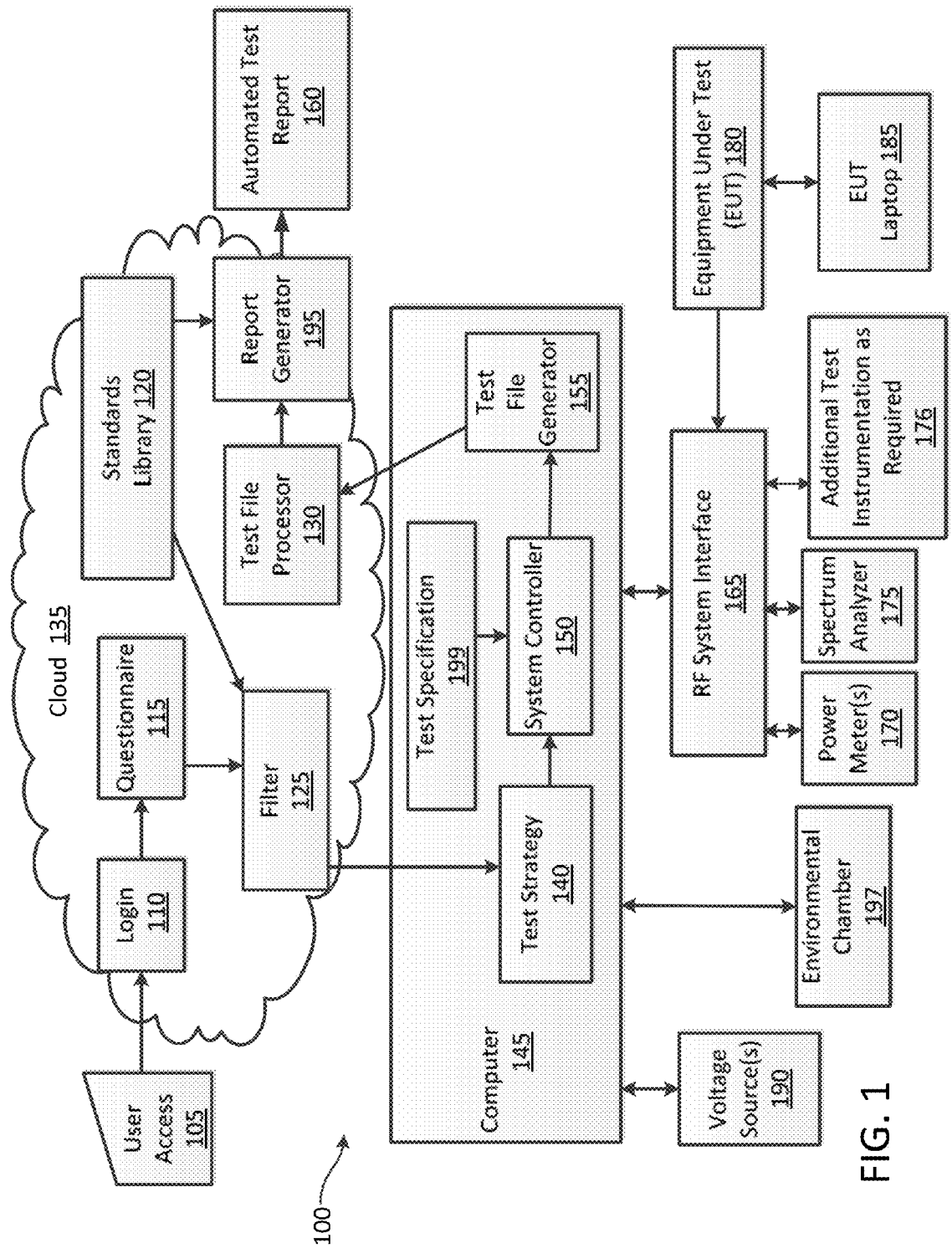
FIG. 1 illustrates a block diagram of a remote modular testing system according to certain embodiments.

FIG. 1 illustrates a block diagram 100 of a remote modular test system according to certain embodiments. For example, for regulatory compliance in certain embodiments, user access 105 may logon via cloud 135 at login 110 which may be cloud-based. User access 105 may be, for example, a remote (Internet) login terminal, such as a computer or mobile device or other user equipment. Cloud 135 may include a plurality of cloud servers configured to implement certain functions (see FIG. 3 at 350). Questionnaire 115 may be disposed within cloud 135 to gather information on a wireless device, parameters (voltage, modulation, etc.) and what standards the device may need to be tested against. Questionnaire 115 may be configured to be a cloud-based memory module/database. Standards library 120 may be disposed within cloud 135 and may include a repository/database of test processes for standards. Filter 125 may be disposed within cloud 135 and may combine inputs from questionnaire 115 and standards library 120 to filter necessary parameters to produce a test strategy file (TS) 140. TS 140 may contain a test standard to be exercised, for example, FCC protocols. TS 140 may be configured as a module/file resident in the memory of computer 145. Computer 145 may be a computer node server.

In certain embodiments, TS 140 may be configured to compile a list of every test that Radio Frequency (RF) interface 165 may need to perform any chosen standard. System controller 150 (system intelligence) may be configured to read TS 140 and to send a test command to RF system interface 165 via computer 145 and to Equipment Under Test (EUT) 180 to perform the necessary test function. EUT 180 may be disposed in an environmental chamber 197 in order to perform testing under various environmental conditions as deemed applicable via any present or future criteria. Environmental chamber 197 may be configured to send and receive signals to and from computer 145/system controller 150. Also, system controller 150 may be configured to allow users to start the test function and to show the name of any current test in progress, voltage, temperature, etc. System controller 150 may also be configured for a secondary function of pointing to test specification 199 used to exercise the test standard. Test specification 199 may be configured as a memory module/file resident in the memory of computer 145. System controller 150 may also log the standard name from TS 140, then point to FCC protocol and test specification 199 which may be then used to execute each test (each line in TS 140). Test specification 199 may contain instructions on how to drive the test instrumentation for each test called out in TS 140. Power meter(s) 170 may be connected to RF system interface 165 during testing operations and measurements via control lines. However, additional equipment can be included as, and when, necessary. For example, according to certain embodiments, additional test instrumentation as required 176, may also be connected to the RF system interface 165.

In certain embodiments, system controller 150 may be configured to control the test sequence such as, the internal RF switching of the RF system test interface 165, timing, and all test equipment functions connected directly to system controller 150 or computer 145. EUT 180 and/or EUT laptop 185 may be under the control of system controller 150. In other words, system controller 150 reads TS 140 and communicates with RF system interface 165, EUT 180 (client equipment) connects, via cables, such as RF cables, to RF system interface 165, and EUT 180 may be under the control of system controller 150 while making EUT 180 measurements. EUT 180 may be directly or indirectly connected to voltage source(s) 190 for voltage and current regulating purposes. Optionally, EUT 180 may be directly connected to computer 145 via a command-line interface (not shown) in order for a user to issue commands (command lines) directly to EUT 180 or EUT 180 may be directly connected to EUT Laptop 185 for similar operational purposes.

In certain embodiments RF system interface 165 (RF system controller) may include a test interface box which controls switching of the relays and act as an interface for test equipment, such as EUT 180. RF system interface 165 may also be configured to receive commands from system controller 150. RF system interface 165 may be configured to be self-calibrating. RF system interface 165 may also be configured to utilize spectrum analyzer 175 and may include, for example, five RF ports in its design preventing a test engineer from manually changing from one port to the next. It should be noted that this port configuration meets the new European Telecommunications Standards Institute (ETSI) standard requirement of triggering multiple power sensors simultaneously. Such a port configuration also can save time and can produce more accurate results as products can be tested simultaneously on the same circuit. Spectrum analyzer 175 may be configured to measure the magnitude of an input signal versus frequency within its full frequency range. Spectrum analyzer 175 may be used, for example, to measure the power of the spectrum of known and unknown signals.

In certain embodiments, test file generator 155 may be augmented with data from TS 140 via system controller 150. System controller 150 may include a processor or microcontroller and memory. Test file generator 155 may be configured to include a unique identifier (test ID) generated by TS 140 upon testing. These test IDs may group together all of the information needed to perform any individual or set of tests, for example, test strategy, frequency band, operational mode, voltage, channel, temperature, limits, or chain test types, etc. The test ID may be a globally unique identifier (GUID) and may be generated in a database when TS 140 is exported. The test ID may then be passed to a test station and returned via test file processor 130 for data processing. The test ID may hold all data processing information by allowing the remote modular test system 100 to uniquely identify a dataset and any corresponding chart/plot in a live update. The test ID may also be used to link a configurator file and charts/plots together in a coherent manner Test file generator 155 data may then be uploaded to cloud 135 for processing at a cloud-based test file processor 130. This data may be encrypted (twice), 128 bit Secure Sockets Layer (SSL) from a test station up to cloud 135 and test file processor 130 encryption at the source, for example, test file generator 155. Therefore, this unique identifier along with test file generator 155 may be processed via automated test report 160. Cloud 135 may generate graphical plots and configurators via report generator 195 which may connect to automated test report 160. Report generator 195 may generate numeric results with associated spectrum plots of supporting test data. Test pass/fail/provisional (provisional—within a predetermined window) criteria may be observed within automated test report 160. Automated test report 160 may be a module configured to automatically create specified test reports based on input from report generator 195. An aspect to providing this comprehensive test information within automated test report 160 and plots may be the myriad of data passed into and back through test file generator 155. A report template may be used by report generator 195 which may be sent to automated test report 160 and plots augmented by information from questionnaire 115 and the selected test from standards library 120.

The test file processor 130 may be configured to receive inputs in the form of test file(s) 155 and outputs graphical plots to automated test report 160. Automated test report 160 may use a set of rules defined in a configurator file specific to each test/combination of tests within standards library 120. This configurator file may be in the form of an XML document and may contain the setup for a configurator data table, specifying the properties of each cell in the data table. These properties may include: type of cell, row span, column span, color, width, alignment, value, measuring unit, number of decimals, margin trigger, link to graphical plot, test file name, start and stop frequencies, wrap property, temperature, frequency, voltage, chain, and test results setup and measuring unit and decimals for the rest results. Each test file generated by test file generator 155 may be processed according to the rules setup in the configurator file. After all test file(s) specific to a test/combination of tests as defined by the configurator file have been processed, an output may be generated in the form of the configurator data table. All graphical plots and configurator data tables may be retained and later used by report generator 195.

Figure 2:
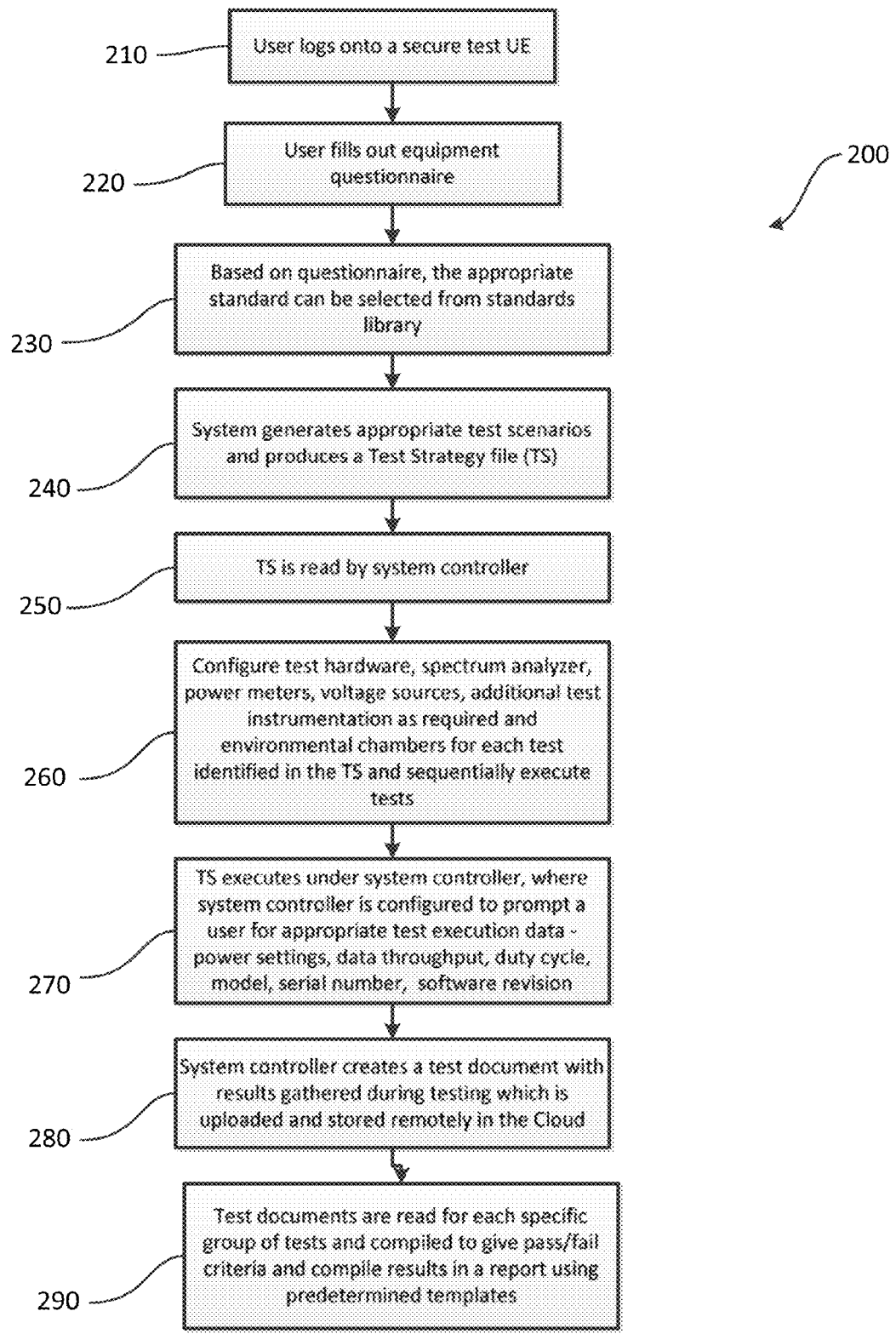
FIG. 2 illustrates a flowchart of a method according to certain embodiments.

FIG. 2 illustrates a flowchart 200 of a method according to certain embodiments. At 210, user logs on with a unique username and password for User Access 105. At 220, user fills out or completes an equipment questionnaire (cloud-based). At 230, based on the questionnaire, the appropriate standard can be selected from a standards library. At 240, the system generates appropriate test scenarios and produces a test strategy (TS) file. At 250, the TS may be read by a system controller. At 260, test hardware, spectrum analyzer, power meters, voltage source(s), environmental chambers and additional test instrumentation may be configured for each test identified in the TS. Each line of the TS may be sequentially executed. At 270, TS executes under system controller, where system controller may be configured to prompt a user for appropriate test execution data, for example, power settings, data rate or throughput, duty cycle, model, serial number, software revision, etc. At 280, system controller may create a test document with results gathered during testing which may be uploaded and stored remotely in the cloud. At 290, test documents may be read for each specific group of tests and compiled to give pass/fail criteria and compile results in a report using predetermined templates. A test file may be generated for each line in the TS contents of which uses input from TS, test data, test equipment data questionnaire, standards library and test execution data.

Figure 3:
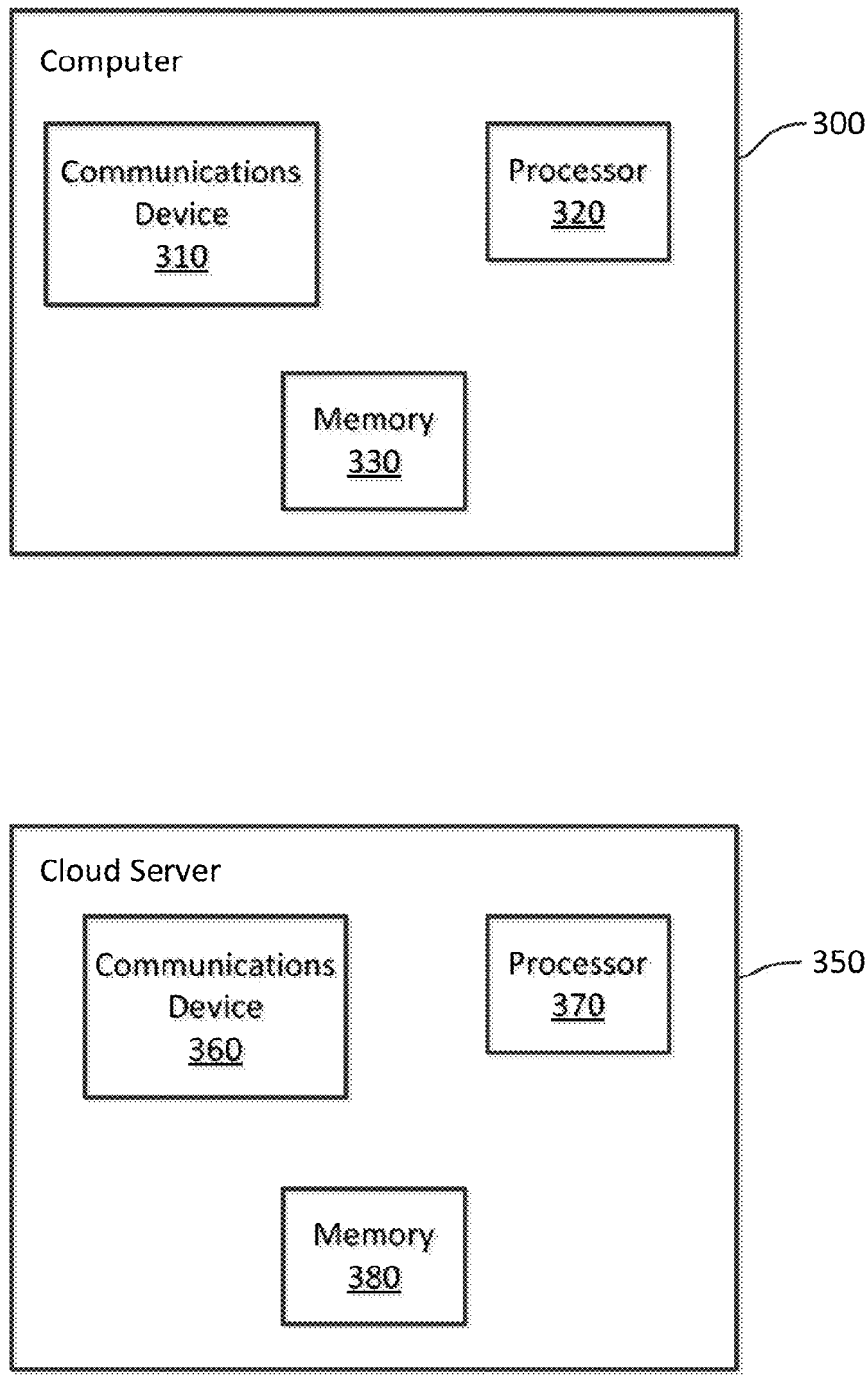
FIG. 3 illustrates a system according to certain embodiments.

FIG. 3 illustrates a system according to certain embodiments. In one embodiment, a system may include several devices, such as, for example, computer 300 and cloud server 350. Computer 300 may correspond to computer 145 and cloud server 350 may correspond to cloud 135, shown in FIG. 1. The system may include more than one computer and cloud server, although only one computer and cloud server is shown for the purposes of illustration.

Each of the devices in the system may include at least one processor, respectively indicated as 320 and 370. At least one memory may be provided in each device, and indicated as 330 and 380, respectively. The memory may include computer program instructions or computer code contained therein. One or more communication devices 310 and 360 may be provided. Other configurations of these devices, for example, may be provided. For example, computer 300 and cloud server 350 may be solely configured for wired or wireless communication (not shown) without being limiting.

Communications devices 310 and 360 may each, independently, be connectable to Ethernet cabling, USB cables, or a unit or device that may be configured for communication between devices.

Processors 320 and 370 may be embodied by any computational or data processing device, such as a central processing unit (CPU), application specific integrated circuit (ASIC), or comparable device. The processors may be implemented as a single controller, or a plurality of controllers or processors.

Memories 330 and 380 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and may be processed by the processors and may be any suitable form of computer program code, for example, a compiled or interpreted computer program written in any suitable programming language.

The memory and the computer program instructions may be configured, with the processor for the particular device, to cause a hardware apparatus such as computer 300 and cloud server 350, to perform any of the processes described above (see, for example, FIG. 2). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Certain embodiments, such as under regulatory compliance, provide an onsite advantage/alternative to existing pre and full regulatory compliance testing that currently is performed in a third party independent facility. This allows prototype pre-testing to be done at the client location instead of being shipped back and forth to test labs. This saves time, money and allows compliance issues to be addressed earlier during the critical new product introductory phase of product release that can help accelerate the product to market.

Further, in certain embodiments, should any technical issues arise during testing, an appropriate engineer may be on-hand to fix any issues. Onsite testing can also help manufactures with existing products that have already been tested and certified and on the market. Components of a product can become obsolescent or can have their specifications changed. Original equipment manufacturer (OEM)/original design manufacturer (ODM)/Manufacturers can stay on top of these issues and ensure continuing compliance by being able to test new components in their system at their premises before updating their device.

In addition, evolving test standards may be updated in certain embodiments to prevent any client from worry about staying on top of the latest, complex standards in countries worldwide. Referring to FIG. 1, alternatively, output from cloud 135 and RF system interface 165 may be stored within computer 145/cloud 135 while maintaining data integrity.

In certain embodiments, automated reports can be produced that may be easy to read with a layout that is recognized and accepted globally by regulatory administrators and includes pass-fail measurements to help design labs stay on track for their pre-testing needs.

Alternatively, certain embodiments may provide the advantage of recording any testing and measurement resulting in test times being drastically reduced and manufactures having greater control of test programs. Referring to FIG. 1, in certain embodiments, system flexibility may allow manufactures to use RF system interface 165 to generate "development type" test programs (not necessarily standards based). Manufacturers have complete traceability in results if RF system interface 165 may be used to pre-test in-house. Thus, manufacturers may save resources through minimal re-test costs at third party laboratories.

A further advantage of using certain embodiments is that with all test facilities there may be issues/problems with the generation of test reports. This can add a significant overhead in the duration of compliance programs. However, the configuration of certain embodiments using test file generator 155, test file processor 130 (cloud-based), and automated test report 160, this reporting issue can be minimized.

In today's world, manufacturers use OEM's and ODM's to produce their wireless products where product compliance is a major issue. Now through the remote modular test system embodiments described above and shown and described in FIGS. 1 to 3, manufacturers can, as part of their product acceptance criteria, insist on automated test report 160 to the applicable test standard and given access, monitor progress in real-time from afar. The manufacturers' data integrity may be maintained—no human intervention required to process data according to certain embodiments and manufacturers may have access to test reports. Certain embodiments provide flexibility to have the remote modular test system onsite for any testing/measurement needs. The flexibility to test onsite at a preferred client location, for example, a manufacturer lab using a same solution gives high confidence to manufacturers.

As standards develop RF system interface 165 has been designed to cater for new standards—having multiple power sensors connected to make simultaneous measurements, as discussed above. The latest standards specifies that testing power is required to be simultaneously triggered for each EUT antenna port (i.e., 4×4 multiple-input and multiple-output (MIMO) implies additional four power sensors added). Manufacturers have found these latest standards extremely complex and difficult to perform.

Certain embodiments offer a number of advantages, such as, development of software modules for new test processes and standards development may be easier to manage; having a common test strategy between multiple parties may be invaluable, in that this test strategy and subsequent report generation is currently accepted by regulatory administrations globally; RF system interface 165 could be removed and replaced by another technology for testing and measurement of devices other than wireless devices; the RF system interface 165 could be redesigned with an equivalent form, fit with the same function—to test and measure to set specifications; production of individualized TS (a test plan) from questionnaire answers and standards library; clients can pre-test their prototypes in their own premises/design lab with actual built-in test standards that may be kept up to date as standards evolve; access to live test data via client's identifiers and a virtual interface, on-the-fly report availability, all test data remains within computer/user account cloud server to eliminate any issue with data integrity (no manual logging of test data required); automation of reports—test report and graphical plots generated automatically; and manufacturers now have a vehicle to produce their own test reports for certification purposes.

Certain embodiments provide multiple capabilities for testing and measurement needs. Ultimately, any test equipment with a control interface can be used with the remote modular testing system. Other embodiments use hardware and software as a vehicle for automated regulatory compliance testing in the cloud.

Certain embodiments can be used to test/measure data for equipment with any test interfaces. Examples of this include Safety Testing, EMC, environmental, conducted immunity, drug/pharmaceutical testing, antenna characterizations, radiated RF and could be beneficial for non-related companies outside the telecommunications industry such as in the medical/environmental. Basically, certain embodiments provide no boundaries in what can be tested as long as there is a control interface on the test equipment.

In certain embodiments a method of a remote modular test system is described. For example, the method may include determining a test strategy (TS) file based on input from cloud-based equipment under test questionnaire and a cloud-based standards library. The method may also include reading the TS file via a system controller. The method may further include configuring various test hardware. The method may also include sequentially executing the TS file based on the configuring. The method may further include generating a test document comprising result data. The method may also include uploading and processing the generated test document in the cloud. The method may further include grouping and compiling the generated test document in a predetermined layout.

In other embodiments an apparatus of a remote modular test system is described. For example, the apparatus may include at least one processor and at least one memory including computer program code. The at least one memory and the computer program code may be configured to, with the at least one processor, cause the apparatus at least to determine a test strategy (TS) file based on input from a cloud-based equipment under test questionnaire and a cloud-based standards library. The computer program code may also be configured to, with the at least one processor, cause the apparatus at least to read the TS file via a system controller. The computer program code may further be configured to, with the at least one processor, cause the apparatus at least to configure test hardware, an analyzer, and power meters via a RF system interface based on the read TS file. The computer program code may also be configured to, with the at least one processor, cause the apparatus at least to sequentially execute the TS file based on the configuring. The computer program code may further be configured to, with the at least one processor, cause the apparatus at least to generate a test document comprising result data. The computer program code may also be configured to, with the at least one processor, cause the apparatus at least to upload and process the generated test document in the cloud. The computer program code may further be configured to, with the at least one processor, cause the apparatus at least to group and compile the generated test document in a predetermined layout.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A method for remote modular testing, the method comprising:
   receiving data, via a node server, from a remote server, wherein the received data comprises a questionnaire file for an equipment to be tested and a selected standard from a standards library database;
   determining, via the node server, a test strategy file based on the received data;
   identifying, via the node server, at least one test to be configured and implemented based on the test strategy file;
   executing, via the node server, the test strategy file for the at least one identified test;
   generating, via the node server, a test results document for the at least one identified test; and
   sending, via the node server, the test results document for the at least one identified test to the remote server,
   wherein the test strategy file comprises at least one test identifier and is executed in the cloud,
   the test identifier identifies each test to be performed, and
   the test identifier identifies the test results document corresponding test results of the equipment, and identifies a location of where the test results document resides in the cloud.

2. The method of claim 1, further comprising:
   receiving, via the node server, test data from at least one equipment under test via a testing interface, wherein the at least one equipment under test is disposed in a test environment.

3. The method of claim 1, further comprising:
   uploading and storing, at the node server, the test results document to a cloud server for remote access.

4. The method of claim 1, wherein the generating comprises generating a test results document including a grouping of pass or fail criteria of the at least one identified test.

5. A method for remote modular testing, the method comprising:
   accessing, via a user equipment, a questionnaire file for an equipment to be tested;
   selecting, via the user equipment, a standard from a standards library database;
   filtering, via the user equipment, data from the questionnaire file and the selected standard for the equipment to be tested;
   sending, via the user equipment, the filtered data to a node server for the equipment to be tested;
   receiving, via the user equipment, a test results document; and
   generating, via the user equipment, a report of the test results document,
   wherein the filtering comprises filtering data including a test strategy file,
   wherein the test strategy file comprises at least one test identifier and is executed in the cloud,
   the test identifier identifies a test to be performed on the equipment, and
   the test identifier identifies the test results document corresponding to test results of the equipment, and identifies a location of where the test results document resides in the cloud.

6. The method of claim 5, wherein the generating comprises generating an automated test report based on the test results document.

7. The method of claim 6, wherein the generating comprises generating an automated test report including a predetermined template layout.

8. An apparatus for remote modular testing, the apparatus comprising:
   at least one processor; and
   at least one memory including computer program code, wherein the at least one memory and the computer program code are configured to, with the at least one processor, cause the apparatus at least to
   receive data, via a node server, from a remote server, wherein the received data comprises a questionnaire file for an equipment to be tested and a selected standard from a standards library database;
   determine, via the node server, a test strategy file based on the received data;
   identify, via the node server, at least one test to be configured and implemented based on the test strategy file;
   execute, via the node server, the test strategy file for the at least one identified test;
   generate, via the node server, a test results document for the at least one identified test; and
   send, via the node server, the test results document for the at least one identified test to the remote server,
   wherein the test strategy file comprises at least one test identifier and is executed in the cloud,
   the test identifier identifies each test to be performed, and
   the test identifier identifies the test results document corresponding to test results of the equipment, and identifies a location of where the test results document resides in the cloud.

9. The apparatus of claim 8, further comprising the at least one memory and the computer program code are configured to, with the at least one processor, cause the apparatus at least to:
   receive, via the node server, test data from at least one equipment under test via a testing interface, wherein the at least one equipment under test is disposed in a test environment.

10. The apparatus of claim 8, further comprising the at least one memory and the computer program code are configured to, with the at least one processor, cause the apparatus at least to:
    upload and store, at the node server, the test results document to a cloud server for remote access.

11. The apparatus of claim 8, wherein the generated test results document comprises a grouping of pass or fail criteria of the at least one identified test.

12. An apparatus for remote modular testing, the apparatus comprising:
    at least one processor; and
    at least one memory including computer program code, wherein the at least one memory and the computer program code are configured to, with the at least one processor, cause the apparatus at least to access, via a user equipment, a questionnaire file for an equipment to be tested;

select, via the user equipment, a standard from a standards library database;

filter, via the user equipment, data from the questionnaire file and the selected standard for the equipment to be tested;

send, via the user equipment, the filtered data to a node server for the equipment to be tested;

receive, via the user equipment, a test results document; and generate, via the user equipment, a report of the test results document, wherein the filtering comprises filtering data including a test strategy file, wherein the test strategy file comprises at least one test identifier and is executed in the cloud, the test identifier identifies a test to be performed on the equipment, and the test identifier identifies the test results document corresponding to test results of the equipment, and identifies a location of where the test results document resides in the cloud.

13. The apparatus of claim 12, wherein the received test results document comprises an automated test report.

14. The apparatus of claim 13, wherein the automated test report comprises a predetermined template layout.

15. A system comprising:
at least one Internet-connected user equipment;
at least one cloud server;
at least one processor; and
at least one memory including computer program code,
wherein the at least one memory and the computer program code are configured to, with the at least one processor, cause the apparatus at least to receive data, via a node server, from a remote server, wherein the received data comprises a questionnaire file for an equipment to be tested and a selected standard from a standards library database;

determine, via the node server, a test strategy file based on the received data;

identify, via the node server, at least one test to be configured and implemented based on the test strategy file;

sequentially execute, via the node server, the test strategy file for the at least one identified test;

generate, via the node server, a test results document for the at least one identified test; and send, via the node server, the test results document for the at least one identified test to the remote server, wherein the test strategy file comprises at least one test identifier and is executed in the cloud, the test identifier identifies each test to be performed, and the test identifier identifies the test results document corresponding to test results of the equipment, and identifies a location of where the test results document resides in the cloud.

16. Executing a computer program product stored on a non-transitory computer-readable medium, the computer program product configured to control a processor to perform the method according to claim 1.

* * * * *